United States Patent
Inoue (10) Patent No.: US 7,337,798 B2
(45) Date of Patent: Mar. 4, 2008

(54) GAS SUPPLY APPARATUS

(75) Inventor: Shozo Inoue, Hachioji (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 180 days.

(21) Appl. No.: 10/569,265

(22) PCT Filed: Aug. 26, 2004

(86) PCT No.: PCT/IB2004/002761

§ 371 (c)(1),
(2), (4) Date: Mar. 13, 2006

(87) PCT Pub. No.: WO2005/022028

PCT Pub. Date: Mar. 10, 2005

(65) Prior Publication Data

US 2007/0012363 A1    Jan. 18, 2007

(30) Foreign Application Priority Data

Aug. 28, 2003   (JP) ............................. 2003-303991

(51) Int. Cl.
    *F16K 31/06*    (2006.01)
(52) U.S. Cl. ....................................... 137/38; 123/529
(58) Field of Classification Search .................. 137/38, 137/351; 123/529
    See application file for complete search history.

(56) References Cited

U.S. PATENT DOCUMENTS

| | | | |
|---|---|---|---|
| 4,721,078 A | * | 1/1988 | Watanabe et al. ..... 123/198 DB |
| 4,841,287 A | | 6/1989 | Flig et al. |
| 4,960,145 A | | 10/1990 | Schlotzhauer |
| 4,971,094 A | | 11/1990 | Gonzalez |
| 5,197,710 A | | 3/1993 | Wass et al. |
| 5,452,738 A | | 9/1995 | Borland et al. |
| 5,596,261 A | | 1/1997 | Suyama |
| 5,611,316 A | * | 3/1997 | Oshima et al. ............. 123/494 |
| 5,755,210 A | * | 5/1998 | Sato et al. ................... 123/518 |
| 5,851,108 A | | 12/1998 | Clymer et al. |
| 5,932,842 A | * | 8/1999 | Eberl et al. .................... 174/47 |

(Continued)

FOREIGN PATENT DOCUMENTS

DE           214 811 A       10/1984

(Continued)

*Primary Examiner*—John Fox
(74) *Attorney, Agent, or Firm*—Oliff & Berridge, PLC (57) ABSTRACT

A gas line (120) for supplying hydrogen gas and a harness (110) for supplying power to an electromagnetic valve are connected to an electromagnetic valve mechanism (200). The length of the harness (110) from a connecting member (111) to a fastener (160) is denoted by the letter "n" and the length of the gas line (120) from a connecting member (121) to a fastener (170) is denoted by the letter "m" (n<m). During a vehicle collision, a hydrogen gas tank (100) moves, placing tension on the harness (110) and the gas line (120). The tension causes both the harness (110) and the gas line (120) to stretch. The limit value of the stretch amount of the harness (110), which is shorter between the connecting member and the fastener, is low such that the harness (110) will break before the gas line (120) is damaged. As a result, power to the electromagnetic valve mechanism (200) is cut off and the electromagnetic valve closes before the gas line (120) is damaged, thus preventing a gas leak.

15 Claims, 10 Drawing Sheets

U.S. PATENT DOCUMENTS

| | | |
|---|---|---|
| 6,041,762 A * | 3/2000 | Sirosh et al. ............... 123/529 |
| 6,227,230 B1 | 5/2001 | Huh |
| 6,294,276 B1 | 9/2001 | Ogino |
| 6,356,551 B1 | 3/2002 | Egbert |
| 6,390,075 B1 * | 5/2002 | Yamazaki et al. .......... 123/529 |
| 6,502,660 B1 * | 1/2003 | Scott et al. ................. 180/314 |
| 6,557,821 B2 * | 5/2003 | Girouard et al. ......... 251/30.03 |
| 2002/0026960 A1 | 3/2002 | Weldon |
| 2002/0088440 A1 | 7/2002 | Weldon et al. |

FOREIGN PATENT DOCUMENTS

| | | |
|---|---|---|
| EP | 0 668 468 A | 8/1995 |
| FR | 2 413 598 | 7/1979 |
| FR | 1 060 936 A2 | 12/2000 |
| JP | U 64-8425 | 1/1989 |
| JP | A 07-189789 | 7/1995 |
| JP | A 07-301359 | 11/1995 |
| JP | A 08-82250 | 3/1996 |
| JP | A 2001-119815 | 4/2001 |

* cited by examiner

PORTION C

GAS SUPPLY APPARATUS

INCORPORATION BY REFERENCE

The disclosure of Japanese Patent Application No. 2003-303991 filed on Aug. 28, 2003, including the specification, drawings and abstract is incorporated herein by reference in its entirety.

BACKGROUND OF THE INVENTION

1. Field of the Invention

The invention relates to gas fuel leak prevention in a gas supply apparatus.

2. Description of the Related Art

Fuel cells have recently gained attention as driving sources for vehicles. A fuel cell is an apparatus that generates electricity by means of an electrochemical reaction between hydrogen and oxygen. The hydrogen, which serves as fuel gas, is supplied to the fuel cell from a hydrogen gas tank, where it is stored under high pressure. A valve that controls the flow of the hydrogen gas is arranged between the hydrogen gas tank and a gas line that supplies the gas to the fuel cell. One such valve has an electromagnetically controlled solenoid valve mechanism so that when it is energized the valve opens, and when it is de-energized the valve closes.

Technology disclosed in JP(A) 7-301359 prevents hydrogen gas from leaking by making the structure of the solenoid valve mechanism one in which a valve closes in the event of electrical failure or damage to the valve body due to the fact that the valve is set to be closed during normal operation.

With this technology, however, if a gas line connected to the hydrogen gas tank is damaged by impact during a vehicle collision, for example, there is a possibility that the solenoid valve mechanism may be energized and the valve may open, resulting in a fuel gas leak unless, the solenoid valve mechanism fails electrically or is also damaged.

This kind of problem is not limited to fuel cell systems, but also appears in various gas storage containers. In view of the foregoing problem, it is an object of this invention is to prevent a gas leak using a simple structure.

SUMMARY OF THE INVENTION

A first aspect of the invention relates to a gas supply apparatus provided with a gas line for supplying a gas, an electromagnetic valve which is provided in the gas line and which opens when energized, and a power supply line for supplying power to energize the electromagnetic valve. According to this aspect of the invention, the gas supply apparatus is structured such that the tensile strength of the power supply line against tension applied to it is less than the tensile strength of the gas line against tension applied to it.

According to this structure, the power supply line breaks from tension before the gas line is damaged from that tension. When the power line breaks, power to the electromagnetic valve is cut off and the electromagnetic valve closes. This makes it possible to prevent a gas leak even if the gas line is later damaged.

According to the foregoing aspect of the invention, the gas supply apparatus may also have, in at least one portion of the power supply line, a connector which becomes disconnected under a tension that is less than a tension that damages the gas line.

According to this structure, the connector becomes disconnected, thereby cutting off the power to the electromagnetic valve, before damage is done to the gas line. Accordingly, it is possible to even more reliably prevent the gas from leaking with a simple structure.

In the foregoing aspect of the invention, the gas supply apparatus may also have, in at least one portion of the power supply line, a breakage facilitating portion which has a low tensile strength. The breakage facilitating portion may, for example, have small cross-sectional area or be made of weak material. Also, all or part of the power supply line may be made of material having a low tensile strength.

According to this structure, it is possible to have the power supply line break at a specific portion, i.e., it is possible to break the power supply line at an intended location, which makes it more convenient in terms of repair and maintenance and the like. This breakage facilitating portion may be located near the valve. Doing so makes it possible to more reliably cut off the power to the electromagnetic valve before the gas line is damaged because it takes less tension to break the power supply line the closer the breakage facilitating portion is to the electromagnetic valve.

A second aspect of the invention relates to a gas supply apparatus provided with a gas line for supplying a gas, an electromagnetic valve which is provided in the gas line and which opens when energized, a power supply line for supplying power to energize the electromagnetic valve, and an adjusting mechanism that adjusts the timing at which tension starts to be applied to the power supply line.

According to this structure, it is possible to adjust the timing at which the tension is applied to the power supply line. Being able to flexibly set the timing and location and the like at which the power supply line breaks increases convenience.

In either the first or the second aspect of the invention, the gas supply apparatus may be mounted in a vehicle.

Also, in the gas supply apparatus according to either the first or the second aspect of the invention, the tension may be force generated by an impact of a predetermined amount or greater generated during a vehicle collision.

According to this structure, the power supply line can be made to break so that power is cut off before the gas line is damaged. As a result, gas can be prevented from leaking, thereby increasing safety.

In the first aspect of the invention, the gas supply apparatus may further be provided with a gas storage container, and the electromagnetic valve may be provided between the gas storage container and the gas line. Further, the gas supply apparatus may be structured such that the tensile strength of the power supply line against tension applied thereto which is generated based on an amount of movement of the gas storage container is less than the tensile strength of the gas line against tension applied thereto which is generated based on an amount of movement of the gas storage container.

According to this structure, the power supply line breaks from tension generated based on the amount of movement of the gas storage container before the gas line is damaged from that tension. When the power line breaks, power to the electromagnetic valve is cut off and the electromagnetic valve closes. This makes it possible to prevent a gas leak even if the gas line is later damaged.

In the second aspect of the invention, the gas supply apparatus may further be provided with a gas storage container. In addition, the gas line may supply gas from the gas storage container, and the electromagnetic valve may be arranged between the gas storage container and the gas line. Moreover, tension that acts on the power supply line may be generated based on the amount of movement of the gas storage container. According to this structure, it is possible to adjust the timing at which the tension generated based on the amount of the movement of the gas storage container is applied to the power supply line. Being able to flexibly set the timing and location and the like at which the power supply line breaks increases convenience.

Also according to the second aspect of the invention, the adjusting mechanism in the gas supply apparatus may be a fastener that fixes the power supply line to a portion other than the gas storage container such that tension is applied to the power supply line with a smaller amount of movement of the gas storage container than the amount of movement of the gas storage container required to damage the gas line.

The power supply line is flexible and is bent with no tension in it when the gas storage container starts to move. By fixing the power supply line using a fastener and adjusting the timing at which the tension starts to be applied so that the power supply line breaks before the gas line is damaged, as in this invention, it is possible to more reliably prevent a gas leak with a simple structure.

In the first or second aspect of this invention, the gas supply apparatus may also be provided with a fastener that fixes the gas storage container. This fastener may determine the direction of movement of the gas storage container. According to this structure, it is possible to dictate, to a certain degree, the direction in which the gas storage container will move in the event that it does move.

DETAILED DESCRIPTION OF THE PREFERRED EMBODIMENTS

Figure 1:
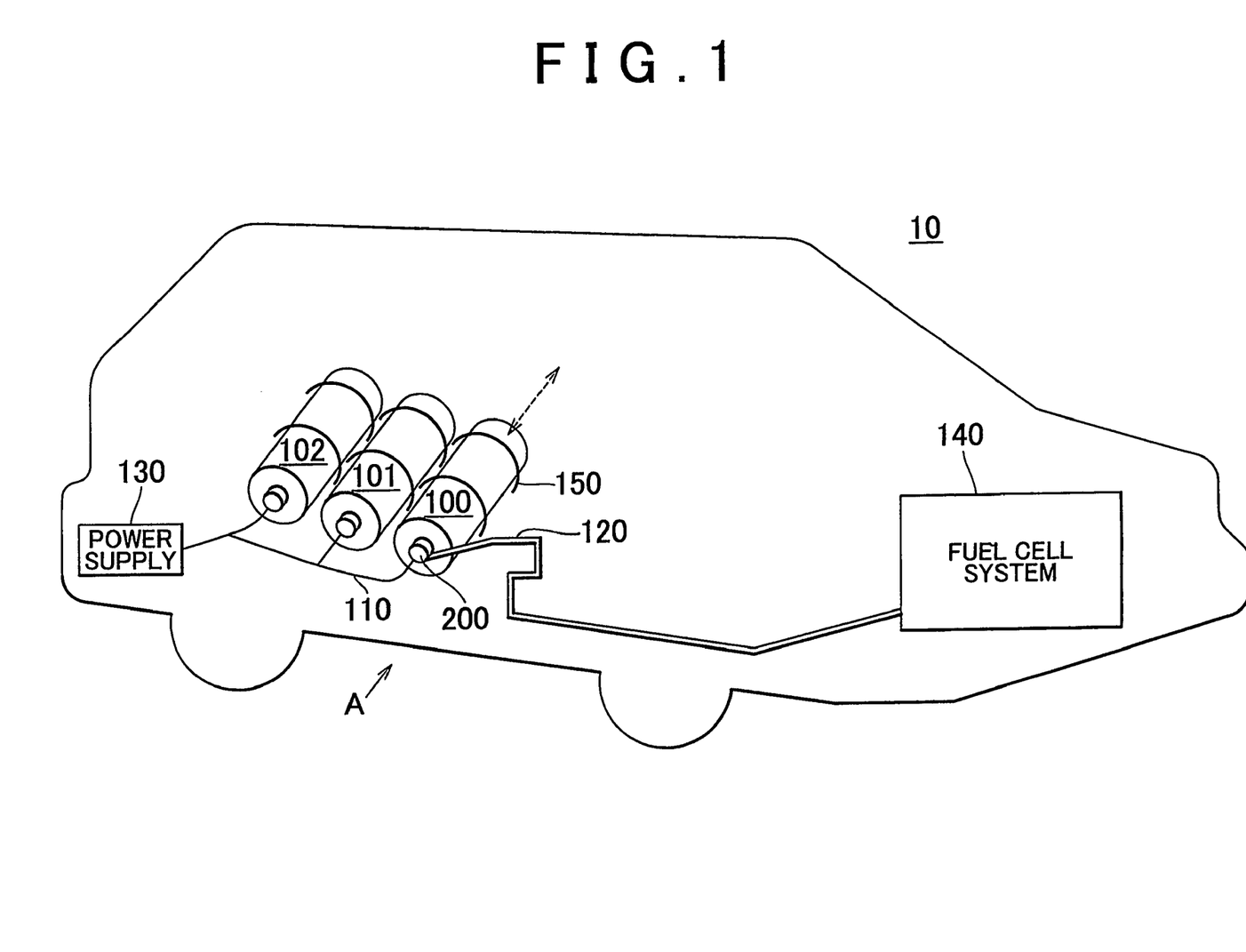
FIG. 1 is a schematic diagram of an in-vehicle hydrogen gas tank according to one exemplary embodiment of the invention.

The following description of exemplary embodiments of the invention will be divided into the following sections.
A. Exemplary Embodiment
A1. General Outline
A2. Electromagnetic Valve Structure
A3. Power Cutoff Mechanism
B. Modified Examples A. Exemplary Embodiment A1. General Outline FIG. 1 is a schematic diagram of an in-vehicle hydrogen gas tank according to one exemplary embodiment of the invention. A vehicle 10 equipped with a fuel cell system 140 that uses electricity generated from an electrochemical reaction between hydrogen and oxygen as fuel includes three hydrogen gas tanks 100, 101, and 102 in which high-pressure hydrogen gas is stored, and fasteners 150 that fasten the hydrogen gas tanks to the vehicle 10, as shown in the drawing. A gas line 120 which supplies hydrogen gas to the fuel cell system 140 is connected to the hydrogen gas tank 100. The fasteners 150 not only serve to fix the hydrogen gas tank to the vehicle, but also to guide the movement of the hydrogen gas tank in the direction shown by the broken line arrow should the tank move due to impact from a vehicle collision. During a vehicle collision, impact force acts in various directions depending on the type of collision, so it is difficult to anticipate the direction in which the hydrogen gas tank 100 will move. In this exemplary embodiment, the fastener 150 not only fixes the tank to the vehicle, but also dictates, to a certain extent, the direction of that movement. The hydrogen gas tanks 101 and 102 are similarly connected to the gas line, but because they have the same structure as the hydrogen gas tank 100, drawings thereof will be omitted for the sake of simplicity.

Figure 2:
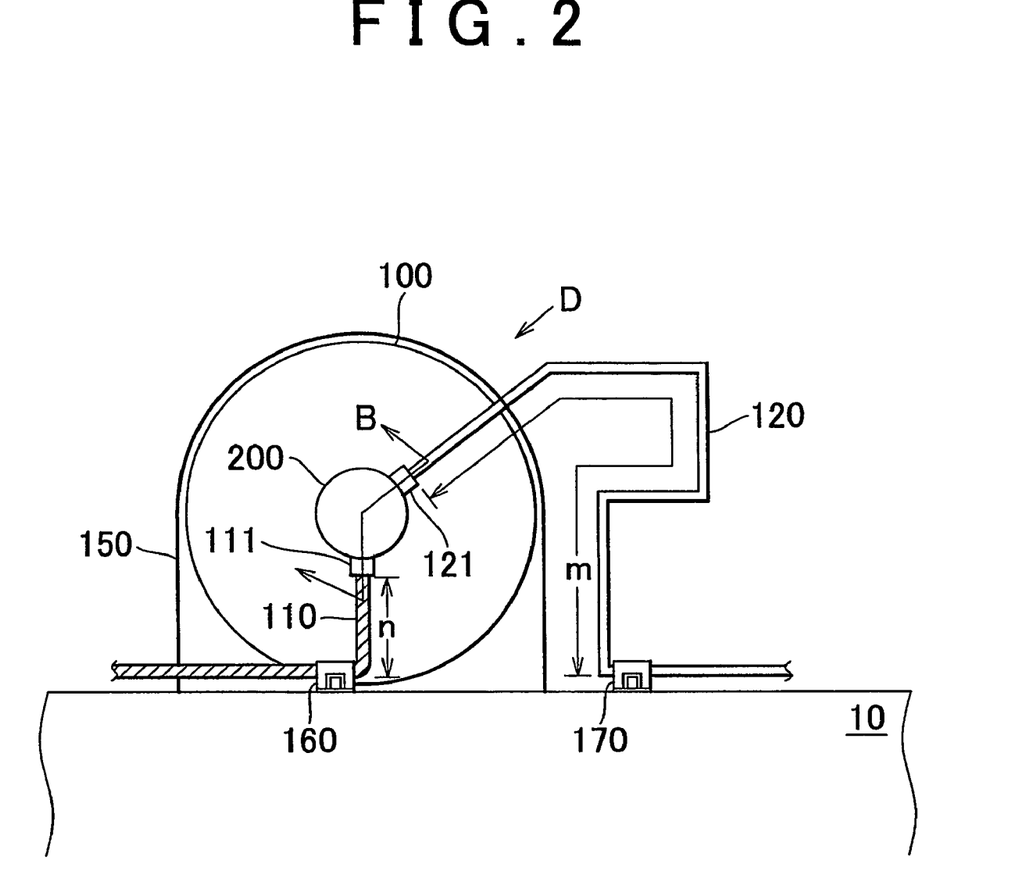
FIG. 2 is a view illustrating the surrounding structure of an electromagnetic valve mechanism according to the exemplary embodiment.

The hydrogen gas tank 100 includes an electromagnetic valve mechanism 200. When energized, a valve in the electromagnetic valve mechanism 200 opens to allow hydrogen gas to flow out into the gas line 120. The hydrogen gas tank 100 receives power from a power source 130 via a harness 110. FIG. 2 is a schematic diagram of the hydrogen gas tank 100 and the surrounding parts as viewed from the direction of arrow A (i.e., from the side) in FIG. 1.

Both the gas line 120 for supplying hydrogen gas and the harness 110 for supplying power to the electromagnetic valve are connected to the electromagnetic valve mechanism 200, which will be described later.

The gas line 120 is connected to the electromagnetic valve mechanism 200 via a connecting member 121 and the harness 110 is connected to the electromagnetic valve mechanism 200 via a connecting member 111. The harness 110 is fixed to the vehicle 10 by a fastener 160 and the gas line 120 is fixed to the vehicle 10 by a fastener 170.

In the drawing, the length of the harness 110 from the connecting member 111 to the fastener 160 is denoted by the letter "n" and the length of the gas line 120 from the connecting member 121 to the fastener 170 is denoted by the letter "m" (n<m). During a vehicle collision, the hydrogen gas tank 100 slides against the fastener 150, moving in a direction from in front of the drawing to behind the drawing (i.e., moving in the direction of arrow A in FIG. 1), so that tension is placed on the harness 110 and the gas line 120. This tension causes both the harness 110 and the gas line 120 to stretch. The harness 110 and the gas line 120 both have different cross-sectional areas and are both made out of different materials, and therefore have different stretch ratios. In this exemplary embodiment, however, this difference of stretch ratios is absorbed by making the length "m" of the gas line 120 from the connecting member 121 to the fastener 170 sufficiently longer than the length "n" of the harness 110 from the connecting member 111 to the fastener 160 such that the amount of bend in the gas line 120 in the direction in which the hydrogen gas tank 100 moves is sufficiently longer than the length "n". As a result, the limit value of the stretch amount of the harness 110, which is shorter between the connecting member and the fastener, is low so the harness 110 will break before the gas line 120 is damaged. FIG. 3 is a cross-sectional view.

A2. Electromagnetic Valve Structure

Figure 3A:
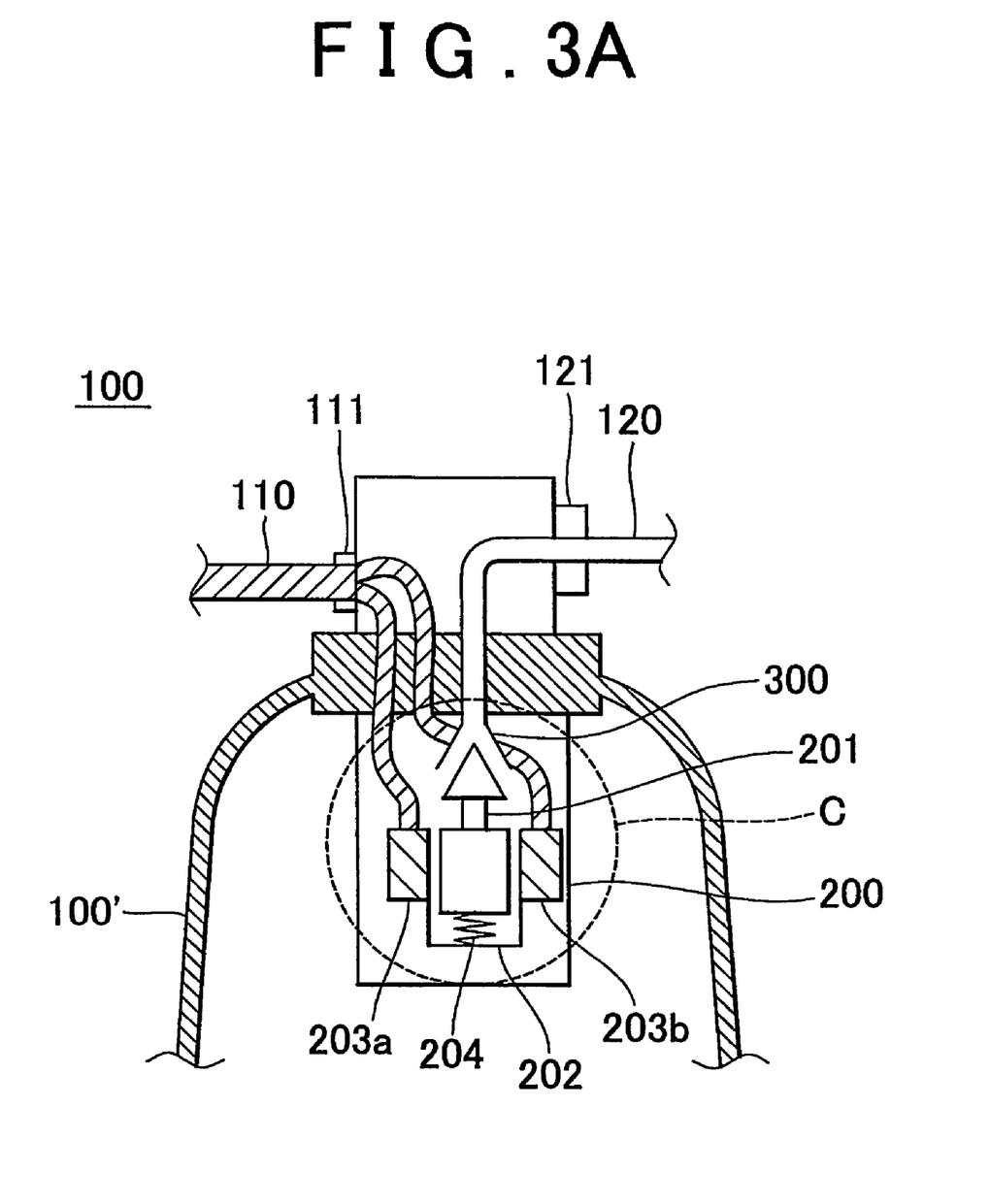
FIG. 3 is a sectional view showing, in frame format, the structure of the electromagnetic valve mechanism according to the exemplary embodiment.

FIG. 3 is a sectional view cut along arrow B in FIG. 2, and shows, in frame format, the structure of the electromagnetic valve mechanism 200. FIG. 3A is a cross-sectional view of the hydrogen gas tank 100. The hydrogen gas tank 100 includes a gas container 100' and the electromagnetic valve mechanism 200. The electromagnetic valve mechanism 200 includes a valve head 201, two solenoids 203a and 203b, a return spring 204, and a support member 202 which supports the return spring 204 and the solenoids 203a and 203b. The electromagnetic valve mechanism 200 is connected to the harness 110 via the connecting member 111 and the gas line 120 via the connecting member 121. The gas line 120 is provided with a valve 300 that controls the flow of hydrogen gas into the electromagnetic valve mechanism 200. The harness 110 is divided into two lines inside the electromagnetic valve mechanism 200. One line is connected to the solenoid 203a and the other line is connected to the solenoid 203b.

Figure 3B:
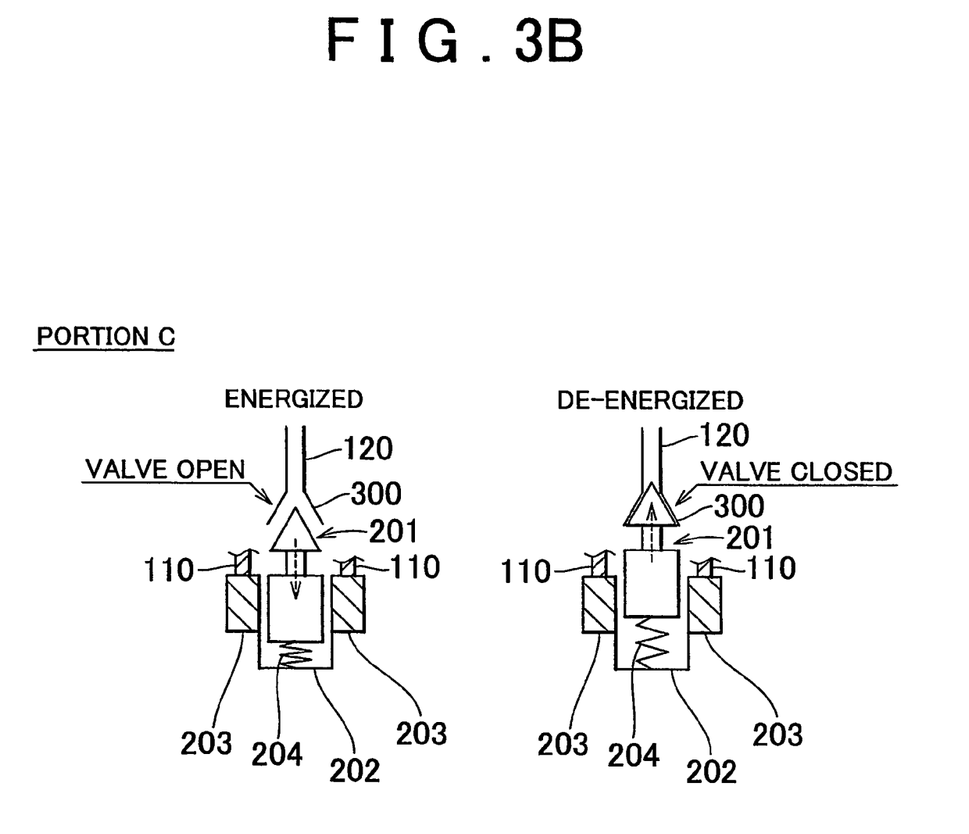

FIG. 3B shows in detail the operation of the portion denoted by the letter "C" encircled by the broken line in FIG. 3A. The left-hand portion of the drawing shows the valve in an open state when power is being supplied from the harness 110. The right-hand portion of the drawing shows the valve in a closed state when the power supply is disconnected.

The left-hand portion of the drawing, in which the electromagnetic valve mechanism is energized will be described. When energized via the harness 110, the solenoids 203a and 203b become electromagnets which generate surrounding magnetic fields. These magnetic fields act on the return spring 204 so that it compresses, thereby pulling the valve head 201 downward in the direction of the broken line arrow. As the valve head 201 is pulled downward, the valve 300 opens and allows hydrogen gas to flow into the gas line 120.

Next, right-hand portion of the drawing, in which the electromagnetic valve mechanism is de-energized will be described. When power is cut off from the harness 110, the magnetic fields around the solenoids 203a and 203b disappear so the return spring 204 returns to its original extended state. As the return spring 204 returns, the valve head 201 is lifted upward in the direction of the arrow such that the valve 300 closes.

A3. Power Cutoff Mechanism

In this exemplary embodiment, the tension generated by the movement of the hydrogen gas tank 100 pulls on both the gas line 120 and the harness 110, but causes the harness 110 to break before the gas line 120 is damaged. When the harness 110 breaks, power to the solenoid is cut off and the valve 300 closes, thereby preventing a gas leak. FIG. 4 is a view showing how the harness 110 breaks, thereby cutting off power to the electromagnetic valve mechanism 200, as the hydrogen gas tank 100 moves.

Figure 4A:
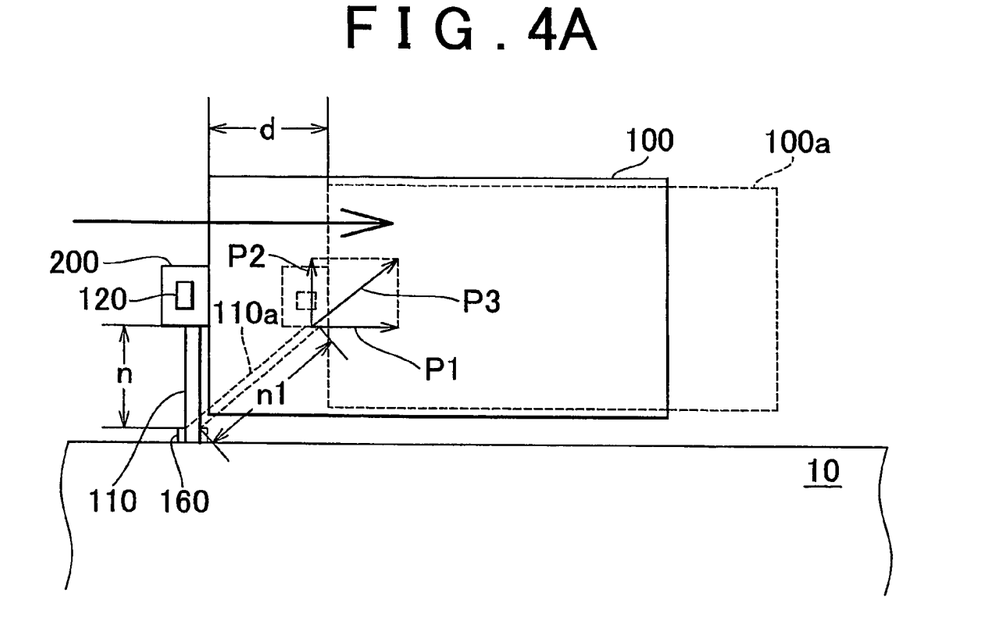
FIG. 4 is a view showing an example of a power cutoff mechanism in the exemplary embodiment.

FIG. 4 is a view from the direction of arrow D in FIG. 2. FIG. 4A shows force generated by the movement of the hydrogen gas tank 100. For the sake of simplicity, the gas line 120 is not shown in detail here. Force in the direction of the bold arrow acts on the hydrogen gas tank 100 due to impact during a vehicle collision, such that it moves as shown by hydrogen gas tank 100a illustrated by the broken line. At this time, because the harness 110 is fixed to the vehicle 10 by the fastener 160 and the electromagnetic valve mechanism 200 side is pulled on by the movement of the hydrogen gas tank 100, tension P1 in the direction of movement of the hydrogen gas tank 100 as well as tension P2 in the upward direction are generated, as shown in the drawing. The harness 110 is therefore pulled on by a combined tension P3, which is the combination of tensions P1 and P2, such that it stretches as shown by harness 110a illustrated by the broken line. As shown in the drawing, when the length of the harness 110 before vehicle collision is "n" and the hydrogen gas tank 100 moves a distance "d" due to impact during a vehicle collision, the harness 110 stretches from the tension to a length of "n1".

Figure 4B:
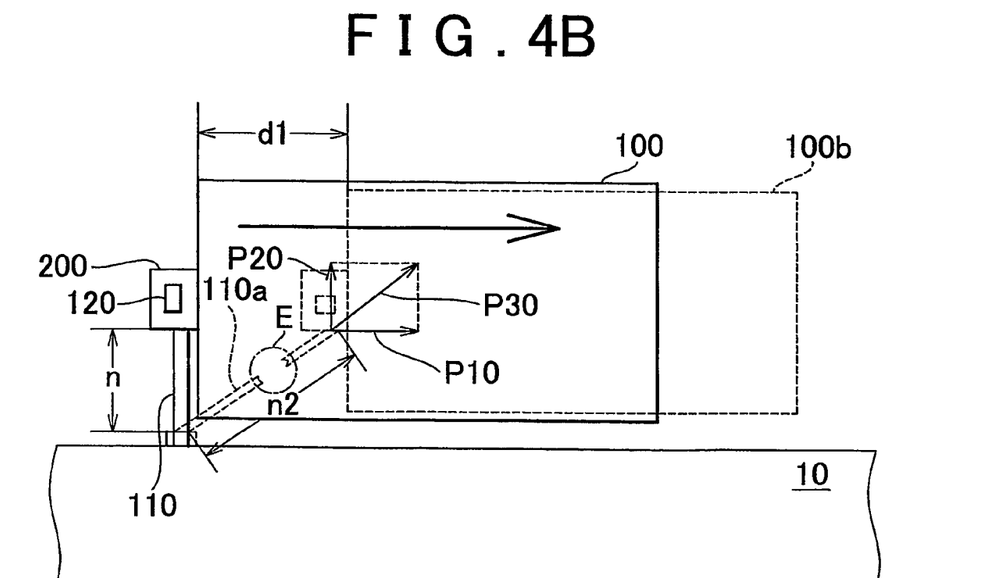

FIG. 4B shows a case in which the harness 110 breaks and power is cut off. Impact causes the hydrogen gas tank 100 to move from the position shown by hydrogen gas tank 100a in FIG. 4A to the position shown by hydrogen gas tank 100b. At this time, the distance of that movement is denoted by "d1". Both tension P10 in the direction of movement of the hydrogen gas tank 100 and upward tension P20 become increase with the distance "d1". The harness 110a is pulled to the limit value of a stretch amount "n2" by the combined tension P30 and then breaks as shown by the dashed line circle E in the drawing. At this time, the gas line 120 still has room to stretch so it is not damaged. When the harness 110 breaks, power to the electromagnetic valve mechanism 200 is cut off, thus closing the valve 300 and stopping hydrogen gas from being supplied to the gas line 120. Therefore, even if the gas line is later damaged, the hydrogen gas will not leak.

Figure 5:
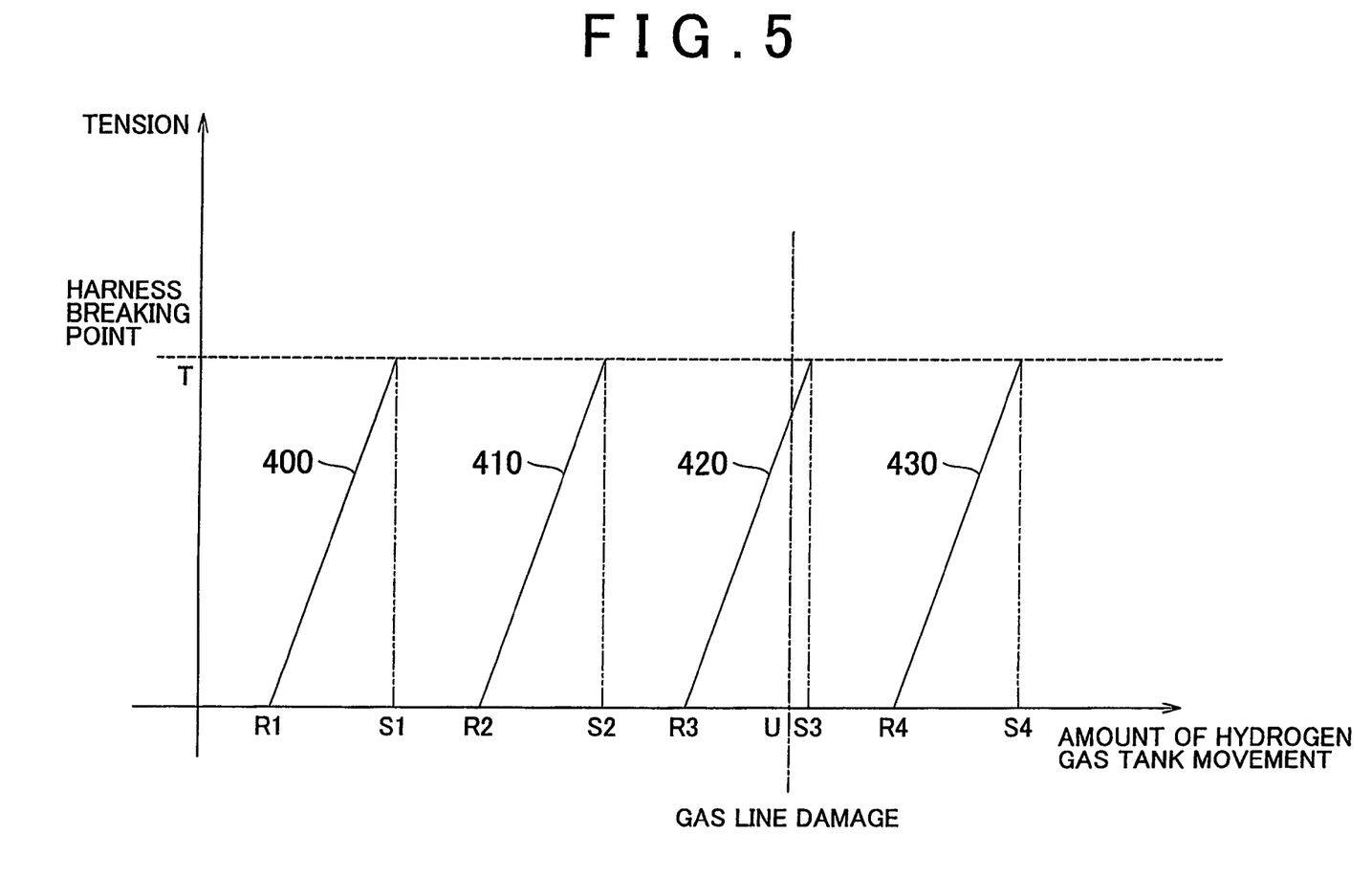
FIG. 5 is a graph showing the relationship between tension and stretch amount of a harness in the exemplary embodiment.

FIG. 5 is a graph illustrating the relationship between the amount of movement of the hydrogen gas tank 100 and tension on the harness 110 due to that movement. The vertical axis of the graph represents the tension on the harness 110 and the horizontal axis represents the amount of movement of the hydrogen gas tank 100. Lines 400 to 430 represent the stretch amounts of the harness from the connecting member 111 to the fastener 160, with the distance therebetween being the shortest in line 400 and increasing in sequence to the longest in line 430. The harness 110 stretches in proportion to the tension according to Hooke's law. When the harness 110 is pulled by tension T shown by the broken line in the drawing, it breaks.

Line 400 in the graph shows the harness 110 starting to be pulled on when the amount of movement of the hydrogen gas tank 100 is "R1" during a vehicle collision. As the hydrogen gas tank 100 moves, the tension increases, reaching "T" when the amount of movement of the hydrogen gas tank 100 is "S1", at which point the harness 110 breaks and power is cut off. Similarly, line 410 in the graph shows the harness 110 starting to be pulled on when the amount of movement of the hydrogen gas tank 100 is "R2" during a vehicle collision. As the hydrogen gas tank 100 moves, the tension increases, reaching "T" when the amount of movement of the hydrogen gas tank 100 is "S2", at which point the harness 110 breaks and power is cut off. Graphs 420 and 430 are similar. Because the distance from the connecting member 111 to the fastener 160 is the shortest in the harness shown by line 400, there little slack so tension starts to be applied as soon as the hydrogen gas tank 100 starts to move. Conversely, because the distance from the connecting member 111 to the fastener 160 is the longest in the harness shown by line 430, there is a large degree of slack so tension is not applied until the amount of movement of the hydrogen gas tank 100 reaches "4R".

The amount of movement "U" of the hydrogen gas tank 100, which is the limit past which the gas line 120 will be damaged, is shown by the alternate long and short dash line in the graph. As shown in graphs 400 and 410, the harness 110 breaks due to an amount of movement (S1, S2) that is less than the amount of movement "U", thereby making it possible to prevent the hydrogen gas from leaking. On the other hand, with line 430 in the graph, because tension does not even start to be applied to the harness 110 until after the hydrogen gas tank 100 has moved more than the amount of movement "U", the gas line ends up being damaged before the harness 110 breaks, making it difficult to prevent a gas leak. With line 420 in the graph, the harness 110 starts to be pulled the amount of movement "R3", which is less than the amount of movement "U". Because the amount of movement "S3" required to break the harness 110 is greater than the amount of movement "U", however, the gas line ends up being damaged before the harness 110 breaks, just as with line 430, again making it difficult to prevent a gas leak.

By adjusting the length of the portion where tension is applied to the harness 110 in this way, it is possible to set the timing at which the harness 110 will break.

As described above, both the gas line and the harness receive tension generated when the hydrogen gas tank moves due to impact during a vehicle collision. By structuring the gas line and the harness in the following manner in the on-board hydrogen gas tank according to the exemplary embodiment described above, it is possible to prevent a hydrogen gas leak with a simple structure. That is, by making the portion of the harness where tension is applied shorter than the portion of the gas line where tension is applied, the harness breaks, thus cutting off power to the electromagnetic valve so that the valve closes, before the gas line is damaged.

Further, by adjusting the length of the portion of the harness where tension is applied, it is possible to adjust the timing at which the harness starts to be pulled, so that tension starts to be applied with a predetermined amount of movement of the hydrogen gas tank.

B. MODIFIED EXAMPLES

While the invention has been described with reference to exemplary embodiments thereof, it is to be understood that the invention is not limited to those exemplary embodiments or constructions. To the contrary, the invention is intended to cover various modifications and equivalent arrangements. Examples of some of these modifications are as follows.

B1. Modified Example 1

The foregoing exemplary embodiment is structured such that the length of the harness from the valve to the fastener that fixes the harness to the vehicle is shorter than the length of the gas line from the valve to the fastener that fixes the gas line to the vehicle. According to this structure, in the event that the hydrogen gas tank moves due to impact during a vehicle collision, the harness breaks, thereby cutting off power to the electromagnetic mechanism, before the gas line is damaged to prevent a gas leak. The invention is not limited to this however. For example, a connector that disconnects from an impact of a predetermined amount or greater may be provided in an electromagnetic valve mechanism or a regulator provided with an electromagnetic valve mechanism, or the like at an arbitrary position on the harness.

Figure 6:
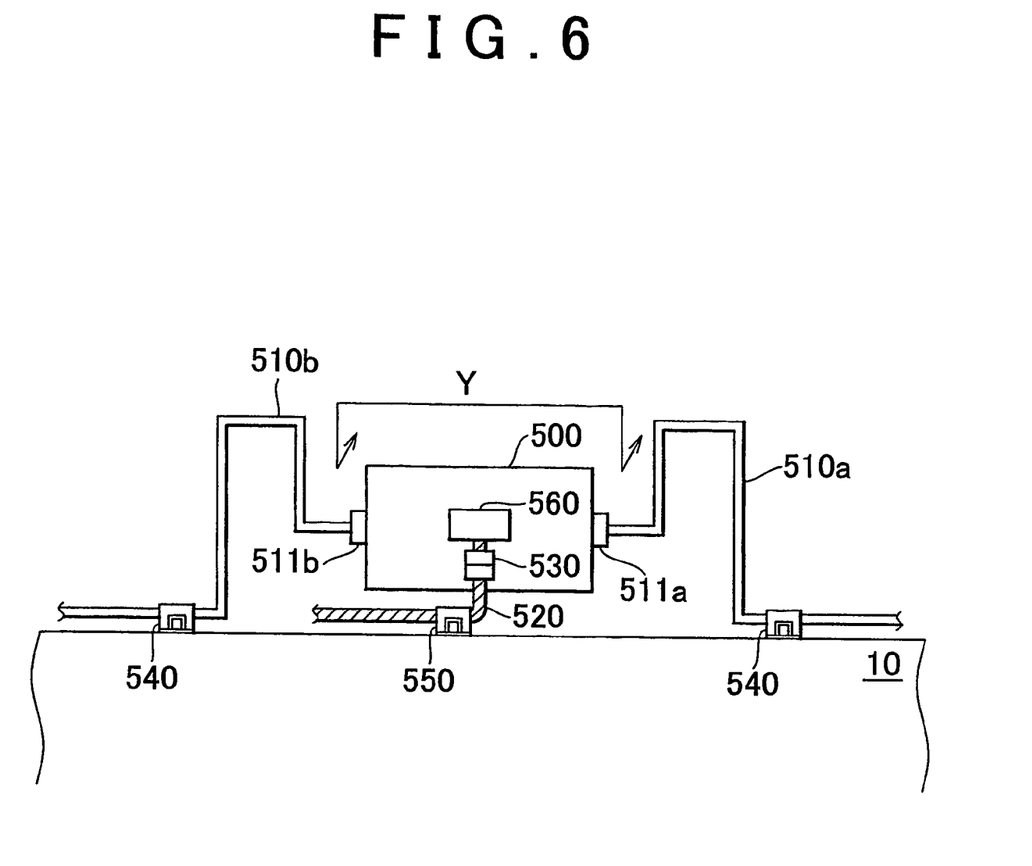
FIG. 6 is a view showing an example of power cutoff means according to one modified example.

FIG. 6 shows an example of power cutoff means using a connector. A regulator 500 includes an electromagnetic valve mechanism 560. An inlet side gas line 510*a* is connected to the regulator 500 via a connecting member 511*a* and an outlet side gas line 510*b* is connected to the regulator 500 via a connecting member 511*b*.

Figure 7:
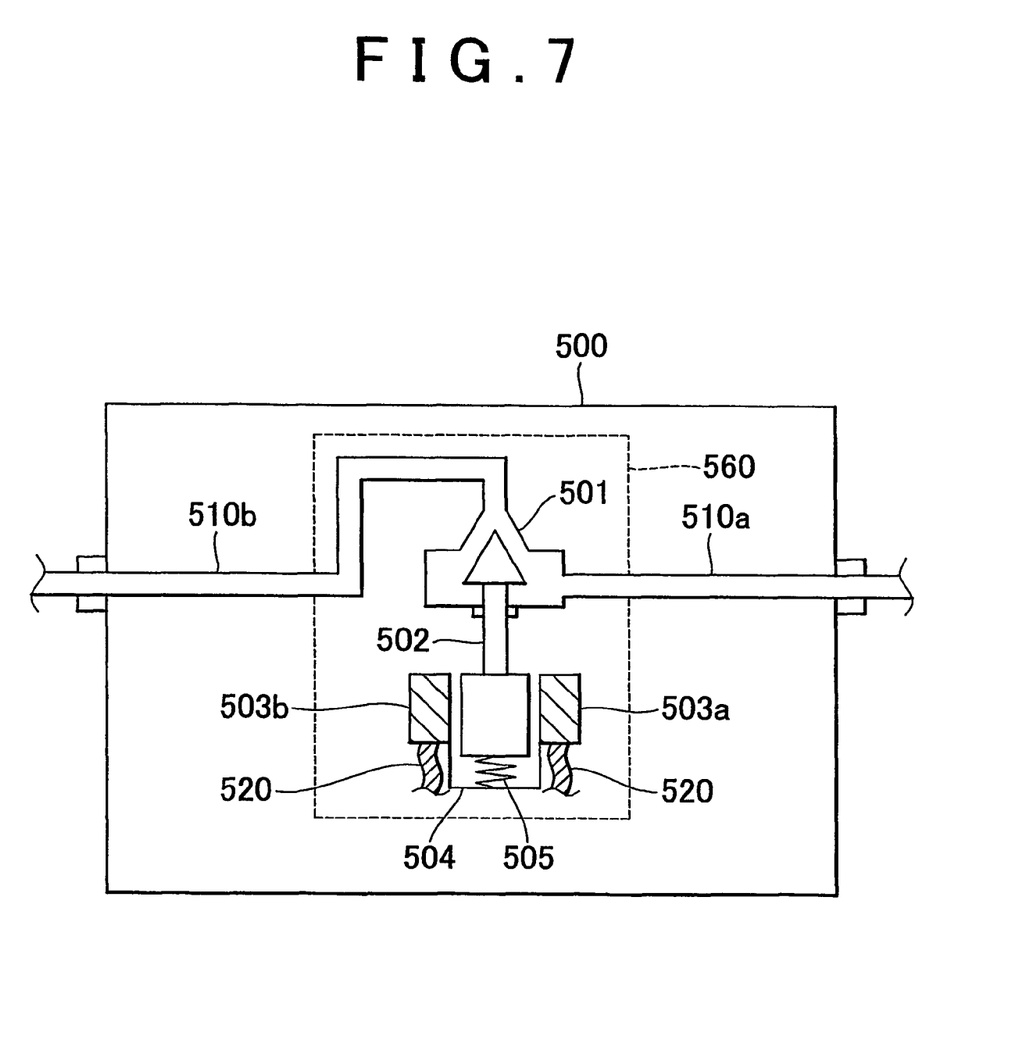
FIG. 7 is a sectional view showing, in frame format, the structure of the electromagnetic valve mechanism according to the modified example.

FIG. 7 is a sectional view showing, in frame format, the structure of the electromagnetic valve mechanism 560 according to one modified example. The electromagnetic valve mechanism 560 is arranged inside the regulator 500. The inlet side gas line 510*a* and the outlet side gas line 510*b* are connected to each other via a valve 501. A valve head 502 which opens and closes the valve 501 has a structure similar to that of the valve head 201 of the foregoing exemplary embodiment shown in FIG. 3. The valve 501 is shown open in FIG. 7. When energized by power being supplied via a harness 520, solenoids 503*a* and 503*b* become electromagnets which generate surrounding magnetic fields. These magnetic fields act on a return spring 505 so that it compresses, thereby pulling the valve head 502 downward. As the valve head 502 is pulled downward, the valve 501 opens and allows gas to flow from the inlet side gas line 510*a* to the outlet side gas line 510*b*.

Returning now to FIG. 6, the inlet side gas line 510*a* and the outlet side gas line 510*b* shown in the drawing, are fixed to the vehicle 10 by fasteners 540. The harness 520 is fixed to the vehicle by a fastener 550, and is provided with a connector 530 between this fastener 550 and the electromagnetic valve mechanism 560. When the connector 530 moves a predetermined amount or more due to the regulator 500 moving with respect to the vehicle 10 from an impact of a predetermined amount or greater, the connector 530 disconnects. As a result, power is cut off and the valve 501 in the electromagnetic valve mechanism 560 closes thereby preventing a gas leak. The predetermined amount of movement of the regulator 500 is a predetermined amount of movement that is not enough to damage the gas line in the event that the regulator 500 moves and pulls on the gas line. The force exerted on the connector 530 when the regulator 500 moves due to impact during a vehicle collision is shown in FIG. 8.

Figure 8:
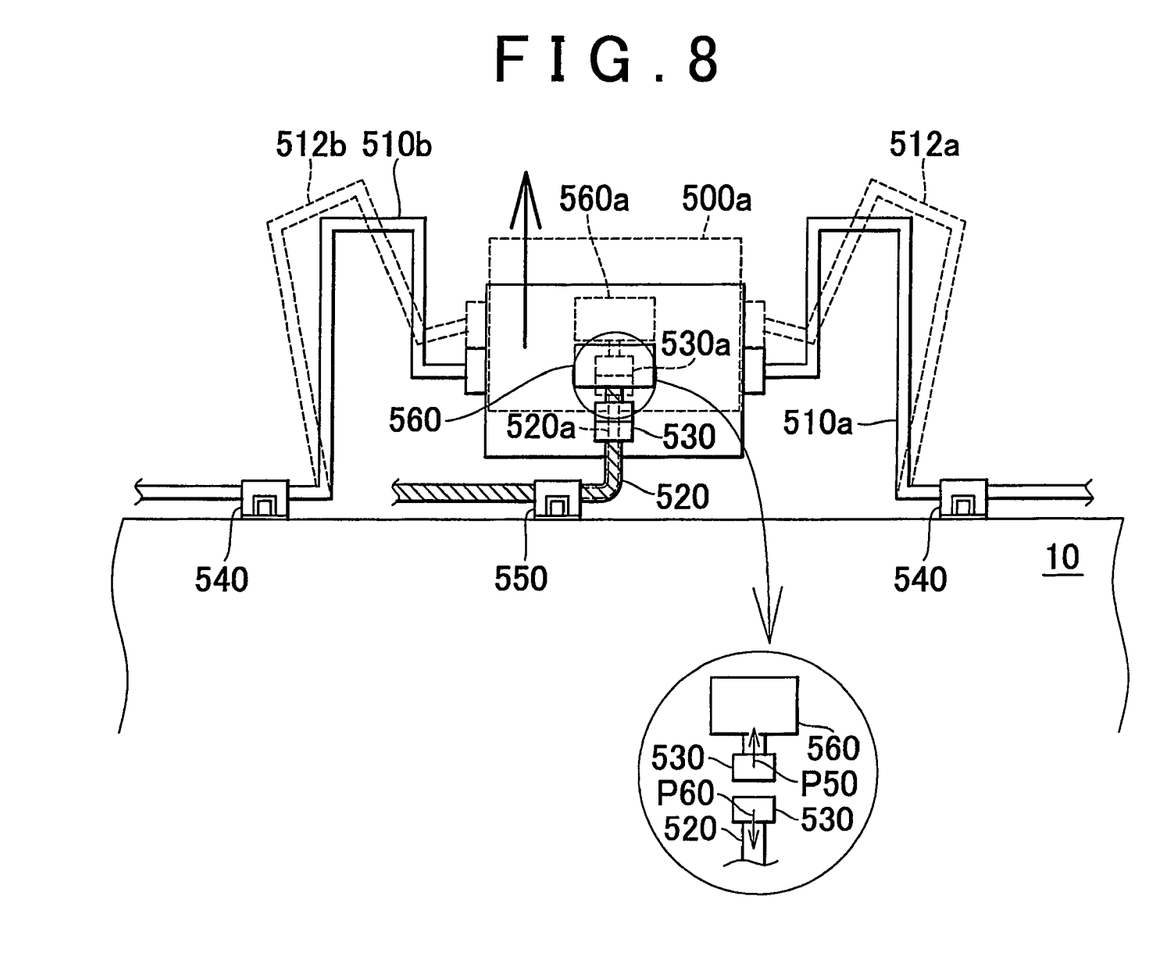
FIG. 8 is a view showing an example of a power cutoff mechanism according to the modified example.

FIG. 8 shows an example of the power cutoff state during a vehicle collision according to the exemplary embodiment. During a vehicle collision, impact force acts in the upward direction as shown by the arrow in the drawing. The solid line shows the power cutoff state before a vehicle collision and the broken line shows the power cutoff state after a vehicle collision.

As shown in the drawing, the regulator 500 moves as shown by regulator 500*a* by the upward impact force. As the regulator 500 moves, the inlet side gas line 510*a* and the outlet side gas line 510*b* stretch, deforming as shown by inlet side gas line 512*a* and outlet side gas line 512*b* illustrated by the broken lines. The harness 520 is also pulled upward and stretches as shown by the harness 520*a*, which results in the connector 530 becoming disconnected as shown by connector 530*a*. An enlarged view shows the tension acting on the connector 530.

An upward pulling force P50 generated by the movement of the regulator 500 and a downward pulling force 60 generated by the harness 110 being fixed by the fastener 550 both act on the connector 530. As a result of these two forces, the connector 530 disconnects and power to the electromagnetic valve mechanism 560 is cut off.

This structure makes it possible to prevent a gas leak even when the regulator 500 moves from impact during a vehicle collision because the connector 530 disconnects, thereby cutting off power before the gas line is damaged.

In this modified example, the harness is fixed to the vehicle by the fastener, but it does not have to be. The same effect can be achieved by adjusting the position of the connector taking into consideration the stretch ratios of the harness and the gas line so that the connector disconnects before the gas line is damaged.

Also in this modified example, the drawing shows the connector positioned relatively near the electromagnetic valve mechanism, but the invention is not limited to this. The connector need only be arranged so that it disconnects before the gas line is damaged. Arranging the connector near the electromagnetic valve mechanism in this modified example makes it is possible to have the connector more reliably disconnect before the gas line is damaged during a vehicle collision, which is preferable.

B2. Modified Example 2

Figure 9A:
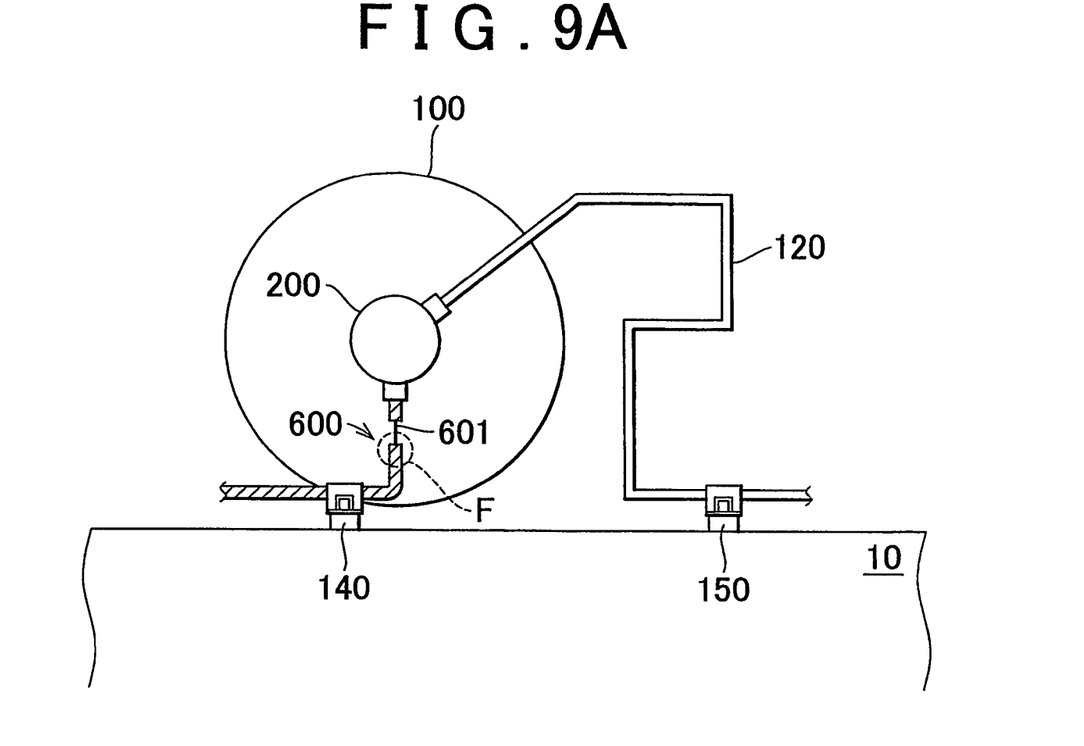
FIG. 9 is a view showing another example of a power cutoff mechanism according to another modified example.
Figure 9B:
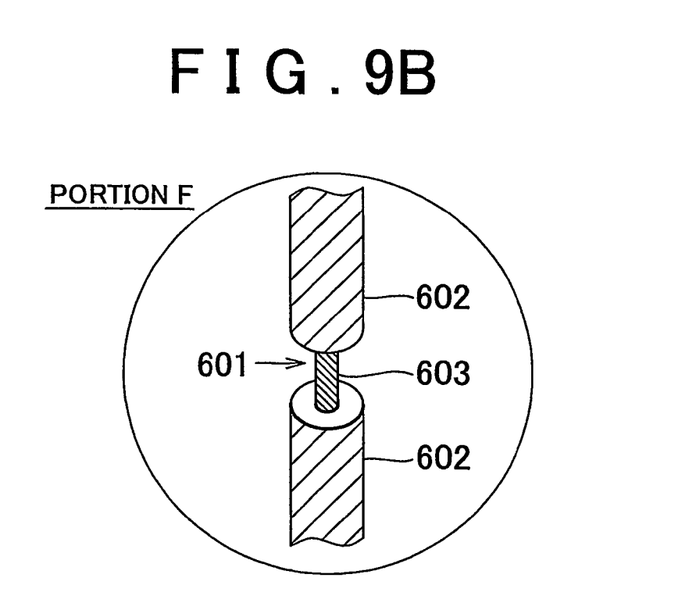

In a construction similar to that of the foregoing exemplary embodiment, a breakage facilitating mechanism that is easily broken may be provided at a portion of the harness. FIG. 9 shows an example of the power cutoff mechanism in this modified example. A harness 600 is a lead line in which copper wire is normally covered in a protective shielding that absorbs impact and the like. As shown in the drawing, however, a breakage facilitating portion 601 in which a portion of the harness 600 is not covered by the protective shielding may also be provided. FIG. 9B is an enlarged view of portion F encircled by the broken line in FIG. 9A. The harness 600 is structured such that a protective shield 602 covers copper wire 603 everywhere except at the breakage facilitating portion 601, where the copper wire 603 is left exposed.

Accordingly, when the hydrogen gas tank moves so that tension is placed on the connector and the gas line, the breakage facilitating portion, which is weak, breaks so that power is cut off before the gas line is damaged. The breakage facilitating portion may be provided in any position as long as it breaks before the gas line is damaged. Providing it near the electromagnetic valve mechanism, however, enables the power to be cut off even more reliably. It is also preferable to set the breakage facilitating portion appropriately taking into consideration various factors such as environment and the difference in the stretch ratios of the gas line and the harness due to the use of different materials.

B3. Modified Example 3

Also in the foregoing exemplary embodiment, the direction of movement is dictated by the fasteners which act as guides, but the invention is not limited to this. That is, the gas tank can move in any direction, but by employing a structure such as that according to this invention, it is possible to prevent a gas leak with high reliability regardless of the direction of movement.

The invention claimed is:

1. A gas supply apparatus, comprising:
a gas line that supplies a gas;
an electromagnetic valve which is provided in the gas line and which opens when energized; and
a power supply line for supplying power to energize the electromagnetic valve, wherein
the tensile strength of the power supply line against tension applied thereto is less than the tensile strength of the gas line against tension applied thereto;
the gas line and the power supply line are connected to the electromagnetic valve; and
the power supply line breaks before the gas line is damaged as the electromagnetic valve moves.

2. The gas supply apparatus according to claim 1, further comprising a connector which becomes disconnected under a tension that is less than a tension that damages the gas line, the connector being provided in at least one portion of the power supply line.

3. The gas supply apparatus according to claim 1, further comprising a breakage facilitating portion which has a low tensile strength, the breakage facilitating portion being provided in at least one portion of the power supply line.

4. The gas supply apparatus according to claim 1, wherein the gas supply apparatus is mounted in a vehicle.

5. The gas supply apparatus according to claim 4, wherein the tension is a force generated by an impact of a predetermined amount or greater generated during a vehicle collision.

6. The gas supply apparatus according to claim 1, further comprising a gas storage container, wherein the electromagnetic valve is provided between the gas storage container and the gas line, wherein the power supply line has a tensile strength being less than the tensile strength of the gas line when a tension is applied thereto which is generated based on the amount of movement of the gas storage container.

7. The gas supply apparatus according to claim 1, further comprising a fastener that fixes the power supply line to a portion other than the gas storage container such that tension is applied to the power supply line with a smaller amount of movement of the gas storage container than the amount of movement of the gas storage container required to damage the gas line.

8. The gas supply apparatus according to claim 6, further comprising a fastener that fixes the gas storage container, wherein the fastener determines the direction of movement of the gas storage container.

9. The gas supply apparatus according to claim 6, wherein the gas supply apparatus is mounted in a vehicle.

10. The gas supply apparatus according to claim 9, wherein the tension is force generated by an impact of a predetermined amount or greater generated during a vehicle collision.

11. A gas supply apparatus, comprising:
a gas line that supplies a gas;
an electromagnetic valve which is provided in the gas line and which opens when energized;
a power supply line that supplies power to energize the electromagnetic valve;
an adjusting mechanism that adjusts the timing at which tension starts to be applied to the power supply line; and
a gas storage container, wherein
the gas line supplies gas from the gas storage container;
the electromagnetic valve is arranged between the gas storage container and the gas line;
the tension that acts on the power supply line is generated based on the amount of movement of the gas storage container; and
the adjusting mechanism in the gas supply apparatus is a fastener that fixes the power supply line to a portion other than the gas storage container such that tension is applied to the power supply line with a smaller amount of movement of the gas storage container than the amount of movement of the gas storage container required to damage the gas line.

12. A gas supply apparatus, comprising:
a gas storage container;
a gas line connected to the gas storage container;
an electromagnetic valve which is provided between the gas storage container and the gas line and which opens when energized;

a power supply line that supplies power to energize the electromagnetic valve;

a first fastener that fixes the power supply line to a portion other than the gas storage container; and a second fastener that fixes the gas line to the portion other than the gas storage container, wherein an amount of bend in the gas line between the electromagnetic valve and the second fastener when the gas storage container moves is longer than a length of the power supply line between the electromagnetic valve and the first fastener.

13. The gas supply apparatus according to claim 11, wherein a length of the gas line between the electromagnetic valve and the second fastener is designed based on a stretch ratio of the power supply line.

14. The gas supply apparatus according to claim 11, wherein a length of the gas line between the electromagnetic valve and the second fastener is longer than a length of the power supply line between the electromagnetic valve and the first fastener so that the power supply line breaks before the gas line is damaged.

15. A gas supply apparatus, comprising:

a gas storage container;

a gas line connected to the gas storage container;

an electromagnetic valve which is provided between the gas storage container and the gas line and which opens when energized;

a power supply line that supplies power to energize the electromagnetic valve;

a first fastener that fixes the power supply line to a portion other than the gas storage container; and a second fastener that fixes the gas line to the portion other than the gas storage container, wherein a length of the gas line between the electromagnetic valve and the second fastener is set so that the power supply line breaks before the gas line is damaged when the gas storage container moves.

* * * * *